March 2, 1965     W. S. DEBENHAM     3,171,736
METHOD AND APPARATUS FOR HANDLING SLAG
Filed Feb. 13, 1961
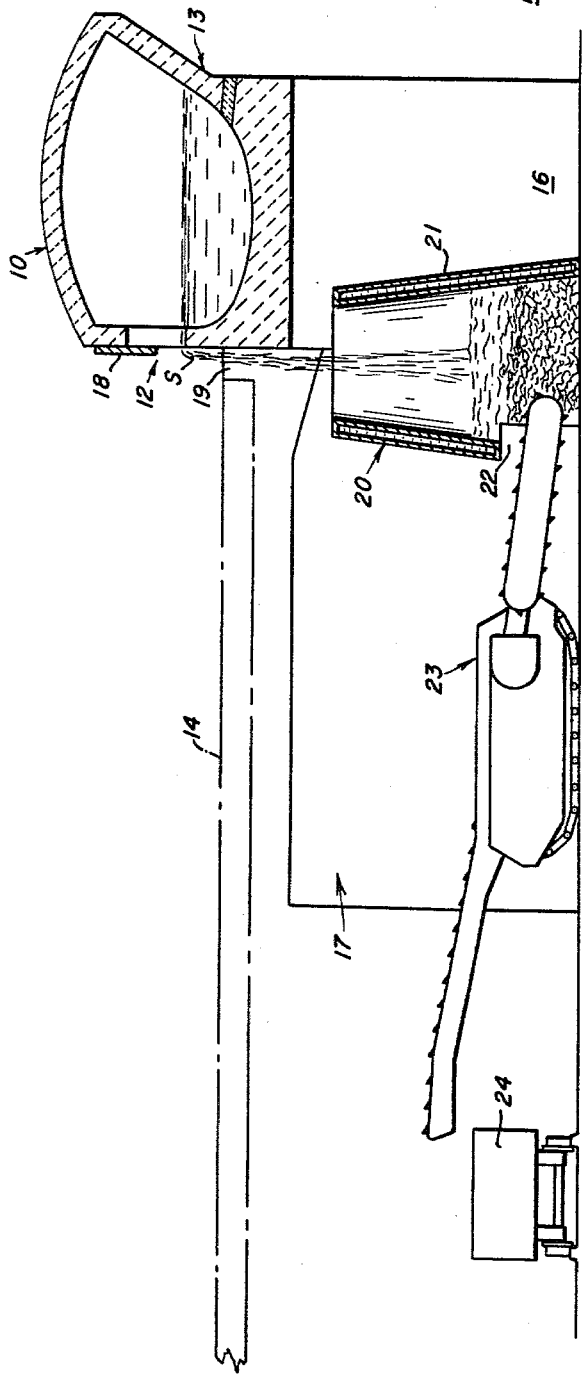
INVENTOR
WILLIAM S. DEBENHAM
By Donald G. Dalton
Attorney

United States Patent Office 3,171,736
Patented Mar. 2, 1965

3,171,736
METHOD AND APPARATUS FOR HANDLING SLAG
William S. Debenham, Mount Lebanon Township, Allegheny County, Pa., assignor to United States Steel Corporation, a corporation of New Jersey
Filed Feb. 13, 1961, Ser. No. 88,800
6 Claims. (Cl. 75—43)

This invention relates to an improved method and apparatus for handling "run-off slag" from an open hearth steel-making furnace.

In the open hearth furnace art, "run-off slag" is the slag taken from the furnace fairly early as a heat of steel is made, that is, soon after the initial charge has been melted down and "hot metal" introduced to the furnace. The more modern practice is to flush this slag from the front or charging side of the furnace. Either it may be caught in a "cinder pot" carried by a car which runs on a track underneath the furnace to the pit at the tapping side, or else it may simply run onto the ground underneath the furnace and the accumulation cleared away later through the pit with a bulldozer, truck or car. Either arrangement creates handling problems. In the first spilled slag often fouls the track and prevents the car from operating. In the second considerable time is required for the slag to cool sufficiently that it can be handled, and for safety reasons it may not be worked while hot metal is in the furnace above. Also hot slag in the open is a hazard, as is the use of water for chilling. Reference may be made to Relling et al. Patent No. 2,492,924 for a showing of an arrangement of the first type and a more detailed explanation of the problems encountered.

An object of the present invention is to provide an improved method and apparatus for overcoming past difficulties in handling run-off slag.

A further object is to provide an improved method and apparatus for handling run-off slag flushed from the front of an open hearth furnace in which the slag runs into a truncated conical vessel, large end down, where it solidifies for easy removal by mechanical means.

In the drawing, the single figure is a diagrammatic vertical sectional view of an open hearth furnace equipped with slag handling apparatus in accordance with my invention.

The drawing shows a conventional open hearth furnace 10 which has charging and tapping sides 12 and 13 respectively. A charging floor 14 extends in front of the charging side. The usual pouring pit 15 is situated along the tapping side at general yard level, and the usual cellar 16 extends under the furnace and charging floor. The cellar contains the usual checker chambers, one of which is indicated in the background at 17. Molten run-off slag S is flushed through a door 18 in the charging side and runs into the cellar through an opening 19 between the charging floor and the furnace.

In accordance with my invention, cellar 16 beneath the charging floor contains a truncated conical steel vessel 20 whose large end is down. The walls of the vessel may carry a water-cooled jacket 21. The top of the vessel is open, and the lower portion of the vessel has an access opening 22 in its side. Slag S runs into vessel 20, where it solidifies, assisted by the cooling effect of water circulating through jacket 21. The sloping sides of the vessel (for example 5° to 10° from vertical) prevent freezing and hanging of the slag to the sides and assure its proper descent. The vessel has sufficient capacity to contain all run-off slag from 3 to 4 consecutive heats made in the furnace. A typical vessel may be about 15 feet high, 8 feet in diameter at the top, and 12 feet in diameter at the bottom. I may employ a conventional mining machine 23 for digging solidified slag from the bottom of the vessel through the access opening 22 and loading the slag in a suitable receiver located beyond the limits of the checker chambers, such as a car or truck 24, or a conveyor, for disposal through the cellar of the shop rather than the pit.

If desired, I may add materials to the slag as it flows into the vessel to assist in cooling and enhance its friability or fracturing when solidified, or to improve its value as a salable product. Examples of materials which cool the slag and make it more friable are dolomite, flue dust, or even debris from the charging floor.

From the foregoing description it is seen my invention affords a simple method and apparatus for handling run-off slag and overcoming problems previously encountered. Slag cooled sufficiently for removal is always at the bottom of the vessel, and the hot or even molten slag from the last heat remains at the top. The slag is fully contained and is not a hazard and also is given three to four times as long to cool as in previous methods requiring removal after each heat. A further advantage is that I do not dispose of slag through the pit where traffic already is heavy, but load it out through the cellar on the opposite side. A single digging and loading machine and a single receiver may serve several furnaces.

While I have shown and described only a single embodiment of my invention, it is apparent that modifications may arise. Therefore, I do not wish to be limited to the disclosure set forth but only by the scope of the appended claims.

I claim:

1. A method of handling run-off slag from an open hearth furnace comprising flushing molten slag from the charging side of the furnace, catching the slag in an open-topped truncated conical vessel whose large end is down, solidifying the slag while in said vessel, and digging solidified slag from the lower portion of said vessel.

2. A method of handling run-off slag from an open hearth furnace comprising flushing molten slag from the charging side of the furnace, catching the slag in an open-topped truncated conical vessel whose large end is down, cooling-cooling said vessel, solidifying the slag while in said vessel, and digging solidified slag from the lower portion of said vessel.

3. A method of handling run-off slag from an open hearth furnace comprising flushing molten slag from the charging side of the furnace, catching the slag in an open-topped truncated conical vessel whose large end is down, water-cooling said vessel, accumulating the slag from several heats of the furnace in said vessel, solidifying the slag while in said vessel with the coolest slag being in the lower portion, and digging solidified slag from the lower portion of said vessel.

4. A method of handling run-off slag from an open hearth furnace comprising flushing molten slag from the charging side of the furnace, catching and solidifying the slag in an open-topped vessel, digging solidified slag from said vessel, and carrying the slag dug from said vessel away from the charging side of the furnace for removal without interfering with operations in the tapping side.

5. The combination, with an open hearth furnace which has means at its charging side for flushing run-off slag, a floor extending in front of the charging side and having a front flushing hole, and a cellar underneath said furnace and floor, of an apparatus for handling the run-off slag comprising an open-topped truncated conical vessel in said cellar beneath said front flushing hole, the large end of said vessel being at the bottom, said vessel being adapted to receive molten slag from said hole and contain the slag while it solidifies, said vessel having an access opening in its lower portion on the side directed away from said furnace, and means for removing solidified slag through said opening.

6. The combination, with an open hearth furnace which has means at its charging side for flushing run-off slag, a floor extending in front of the charging side and having a front flushing hole, and a cellar underneath said furnace and floor, of an apparatus for handling the run-off slag comprising an open-topped truncated conical vessel in said cellar beneath said front flushing hole, the large end of said vessel being at the bottom, means for water-cooling said vessel, said vessel being adapted to receive molten slag from said hole and having a capacity to accumulate the slag from several heats of the furnace and contain this slag while it solidifies, said vessel having an access opening in its lower portion on the side directed away from said furnace, and means for removing solidified slag through said opening.

References Cited in the file of this patent

UNITED STATES PATENTS

| | | |
|---|---|---|
| 2,079,111 | Edgar | May 4, 1937 |
| 2,442,036 | Caldwell | May 25, 1948 |
| 2,448,882 | Greffe | Sept. 7, 1948 |
| 2,471,562 | Fitterer | May 31, 1949 |
| 2,492,924 | Kelling et al. | Dec. 27, 1949 |
| 2,702,407 | Osborne | Feb. 22, 1955 |

FOREIGN PATENTS

| | | |
|---|---|---|
| 3,812 | Great Britain | Sept. 20, 1880 |
| 755,262 | Great Britain | Aug. 22, 1956 |
| 579,681 | Canada | July 14, 1959 |

OTHER REFERENCES

The Making and Shaping and Treating of Steel, published by United States Steel, Seventh Edition, pages 174–177.

United States Steel Text, The Making, Shaping and Treatment of Steel, Seventh Edition, 1957, page 311.

UNITED STATES PATENT OFFICE
CERTIFICATE OF CORRECTION

Patent No. 3,171,736                          March 2, 1965

William S. Debenham

It is hereby certified that error appears in the above numbered patent requiring correction and that the said Letters Patent should read as corrected below.

Column 2, line 44, for "cooling-cooling" read -- water-cooling --.

Signed and sealed this 27th day of July 1965.

(SEAL)
Attest:

ERNEST W. SWIDER
Attesting Officer

EDWARD J. BRENNER
Commissioner of Patents